US012342435B2

(12) United States Patent
Yang et al.

(10) Patent No.: US 12,342,435 B2
(45) Date of Patent: Jun. 24, 2025

(54) DRIVER FOR DRIVING AN LED LIGHT ENGINE OF AN LED TUBE

(71) Applicant: LEDVANCE GmbH, Garching (DE)

(72) Inventors: Xusheng Yang, Shenzhen (CN); Xia Song, Shenzhen (CN)

(73) Assignee: LEDVANCE GMBH, Garching Bei München (DE)

( * ) Notice: Subject to any disclaimer, the term of this patent is extended or adjusted under 35 U.S.C. 154(b) by 0 days.

(21) Appl. No.: 18/132,156

(22) Filed: Apr. 7, 2023

(65) Prior Publication Data

US 2023/0337344 A1 Oct. 19, 2023

(30) Foreign Application Priority Data

Apr. 18, 2022 (CN) ......................... 202210405315.9

(51) Int. Cl.
*H05B 45/36* (2020.01)
*H05B 45/355* (2020.01)
*H05B 45/38* (2020.01)

(52) U.S. Cl.
CPC ........... *H05B 45/38* (2020.01); *H05B 45/355* (2020.01); *H05B 45/36* (2020.01)

(58) Field of Classification Search
CPC ........ H05B 45/36; H05B 45/37; H05B 45/38; H05B 45/375; H05B 45/382; H05B 45/3578; H05B 45/3725
See application file for complete search history.

(56) References Cited

U.S. PATENT DOCUMENTS

2007/0252534 A1* 11/2007 Foo .................... H05B 41/3922 315/291
2014/0225520 A1* 8/2014 Zhang ................ H05B 45/3725 315/188
2016/0081147 A1* 3/2016 Guang ................ H05B 45/345 315/123
2017/0093274 A1* 3/2017 He ...................... H02M 1/4225
2017/0149236 A1* 5/2017 Mallory .................. H02M 7/06
2019/0045598 A1* 2/2019 Hsia ...................... H02J 7/0068
2020/0084856 A1* 3/2020 Hsia .......................... H02J 7/00
2020/0309328 A1* 10/2020 Tao ....................... F21V 23/023

* cited by examiner

*Primary Examiner* — Tung X Le
(74) *Attorney, Agent, or Firm* — Hayes Soloway PC

(57) ABSTRACT

A driver for driving an LED light engine of an LED tube is provided. The driver includes (I) a first driver unit including an input stage for connecting to a power supply, an output stage for connecting to the LED light engine, and a power converter stage for converting input power from AC mains or a CCG (electromagnetic control gear) into an output power for driving the LED light engine and (II) a second driver unit including an input stage for connecting to a power supply, an output stage for connecting to the LED light engine, and a power converter stage for converting input power from an ECG (electronic control gear) into an output power for driving the LED light engine. The two driver units are alternatively activatable for driving the LED light engine depending on when the LED tube is connected to AC mains, a CCG, or an ECG.

20 Claims, 8 Drawing Sheets

DRIVER FOR DRIVING AN LED LIGHT ENGINE OF AN LED TUBE

CROSS-REFERENCE TO RELATED APPLICATION(S)

This patent application claims priority to Chinese Patent Application No. 202210405315.9, filed on Apr. 18, 2022, which is herein incorporated by reference in its entirety.

FIELD OF THE DISCLOSURE

The technical field of the present disclosure generally relates to electric drivers, in particular, to drivers for driving light-emitting diode (LED) light engines of LED tubes.

BACKGROUND

Light-emitting diode (LED) products with LED light engines and drivers for driving LED light engines, such as LED lamps, LED tubes, etc., are known. LED tubes with driver circuits for driving the LED light engines from different power supplies, such as AC mains, electromagnetic control gear (CCG), or electronic control gear (ECG) are known, as well. Achieving compatibility of LED tubes to different power supplies and ensuring compliance with legal requirements (e.g., Single Light Regulation or SLR) for flicker reduction often results in low efficiency and high complexity of the driver circuits.

SUMMARY

The object of the present disclosure is to provide a high-efficiency driver for driving a light-emitting diode (LED) light engine of an LED tube compatibly with different power supplies or operation modes.

According to a first aspect, a driver for driving an LED light engine of an LED tube is provided.

The driver comprises a first driver unit with an input stage for connecting the first driver unit to a power supply and an output stage for connecting the first driver unit to the LED light engine. In particular, the input stage of the first driver unit may comprise input terminals electrically connectable to a first pair of contacts at a first end of the LED tube and output terminals electrically connectable to the LED light engine. The first driver unit further comprises a power converter stage for converting an input power from an AC mains or a CCG (electromagnetic control gear) into an output power for driving the LED light engine.

The driver further comprises a second driver unit with an input stage for connecting the second driver unit with a power supply and an output stage for connecting the first driver unit to the LED light engine. In particular, the input stage of the second driver unit may comprise input terminals electrically connectable to a second pair of contacts at a second end of the LED tube and output terminals electrically connectable to the LED light engine. The second driver unit further comprises a power converter stage for converting an input power from an ECG (electronic control gear) into an output power for driving the LED light engine.

The first driver unit and the second driver unit are electrically connectable to the LED light engine in such a way that the first driver unit and the second driver unit are alternatively activatable for driving the LED light engine by the first driver unit, when the LED tube is connected to an AC mains or a CCG, and the second driver unit, when the LED tube is connected to an ECG.

Due to the alternative activation of the first driver unit for driving the LED light engine from an AC mains or a CCG and the second driver unit for driving the LED light engine from a ECG, a universal driver architecture is provided, enabling a highly efficient operation of the LED tube and adaptable to all three types of power supply. Thus, the complexity of the product portfolio can be reduced and the end user experience with the versatile installation of the LED tube can be improved.

The power converter stage of the first driver unit may comprise a power factor corrected boost converter with a negative feedback logic for mains and CCG operation, in particular adapted to the mains and CCG operation modes. Due to the boost converter with a negative feedback logic, dedicated to mains and CCG operation, a higher output current and accordingly a shorter on-time (Ton) regulation in the mains and CCG operation modes can be achieved.

The power converter stage of the second driver unit may comprise a HF (high frequency) bridge rectifier and a boost converter with positive feedback logic for ECG operation, in particular adapted to the ECG operation mode. Due to the HF bridge rectifier and a boost converter with a negative feedback logic, dedicated to ECG operation, a higher output current and a longer on-time (Ton) regulation in the ECG operation mode can be achieved.

The input stage of the first driver unit may comprise a first filament network configured to act as an EMI (electromagnetic interference) filter for mains and CCG operation and as an LED tube filament for the ECG operation. The EMI filter and the filament properties of the first filament network of the first driver stage ensure the compatibility of the first filament network of the first driver stage to all three operation modes.

The first filament network may comprise an input capacitor and a PTC (Positive Temperature Coefficient) resistor connected in parallel with the input capacitor. The resistance of the PTC resistor increases with growing temperature. The capacitor may act as an EMI filter, during mains or CCG operation, and as a frequency shorter during ECG operation. The PTC resistor may act as a self-heating passive component powered by mains voltage. The resistance of the PTC resistor increases significantly when it reaches its Curie temperature. In the ECG operation mode, the PTC resistor may act as a filament DC impedance network which can be detected by an ECG filament detection section, ensuring the ECG compatibility of the LED tube.

The input stage of the second driver unit may comprise a second filament network configured to act as a low impedance pass filter for the mains and CCG operation and as a high frequency shorter as well as a filament current limiter for the ECG operation.

The low impedance, during the mains and CCG operation, and the filament current limiting, during the ECG operation, ensures the compatibility of the second filament network of the second driver stage to all three operations modes.

The second driver unit may comprise a relay and a relay trigger circuit configure for electrically connecting the input stage and the power converter stage of the second driver unit. By galvanically isolating the input stage from the converter stage of the second driver unit by means of the relay, the safety of installers while mounting the LED tube into a luminaire, the so-called pin-safety of the LED tube, can be ensured.

According to a second aspect an LED tube is provided. The LED tube comprises a first pair of contact pins arranged at a first end of the LED tube and a second pair of contact pins arranged at a second end of the LED tube. The LED tube further comprises an LED light engine and a driver according to the first aspect for driving the LED light engine. The first pair of contact pins are electrically connected to the input stage of the first driver unit and the second pair of contact pins are electrically connected to the input stage of the second driver unit. The first driver unit and the second driver unit are electrically connected to the LED light engine in such a way that the first driver unit and the second driver unit are alternatively activatable for driving the LED light engine by the first driver unit, when the LED tube is connected to an AC mains or a CCG, and the second driver unit, when the LED tube is connected to an ECG. Due to the alternative activation of the first driver unit for driving the LED light engine from an AC mains or a CCG and the second driver unit for driving the LED light engine from a ECG, an LED tube with a universal driver architecture is provided, enabling a highly efficient operation of the LED tube with different power supplies.

The LED light engine may comprise an LED circuit with a first set of contacts at the first end of the LED tube, a second set of contacts at the second end of the LED tube and electrical lines electrically connecting at least one contact of the first set of contacts with at least one contact of the second set of contacts. In particular, the LED light engine may comprise an elongated substrate extending between the first end and the second end of the LED tube, the first set of contacts being arranged at the first end of the substrate and the second set of contacts being arranged at the second end of the substrate. Due to the electrical connection between the first set of contacts with the second set of contacts, the LED light engine can be contacted from both ends by the first driver unit and the second driver unit, such that the number of connection points between the driver units and the LED light engine as well as the overall complexity of the electrical circuitry of the LED tube can be reduced.

The LED light engine may be connected to the first driver unit and the second driver unit in such a way that at least one electrical line electrically connecting at least one contact of the first set of contacts connected with a corresponding contact of the second set of contacts establishes an electrical connection between the first driver unit and the second driver unit. Thus, the LED light engine, in particular, in addition to the LED circuit, provides an electrical path for connecting the first driver unit with the second driver unit. The connection path though the LED light engine provides an additional design freedom and can help to achieve a compact arrangement of the LED light engine and the driver within the LED tube.

In the following description, details are provided to describe the embodiments of the present specification. It shall be apparent to one skilled in the art, however, that the embodiments may be practiced without such details.

Some parts of the embodiments have similar parts. The similar parts may have same names or similar part numbers. The description of one part applies by reference to another similar part, where appropriate, thereby reducing repetition of text without limiting the disclosure.

DETAILED DESCRIPTION

Figure 1:
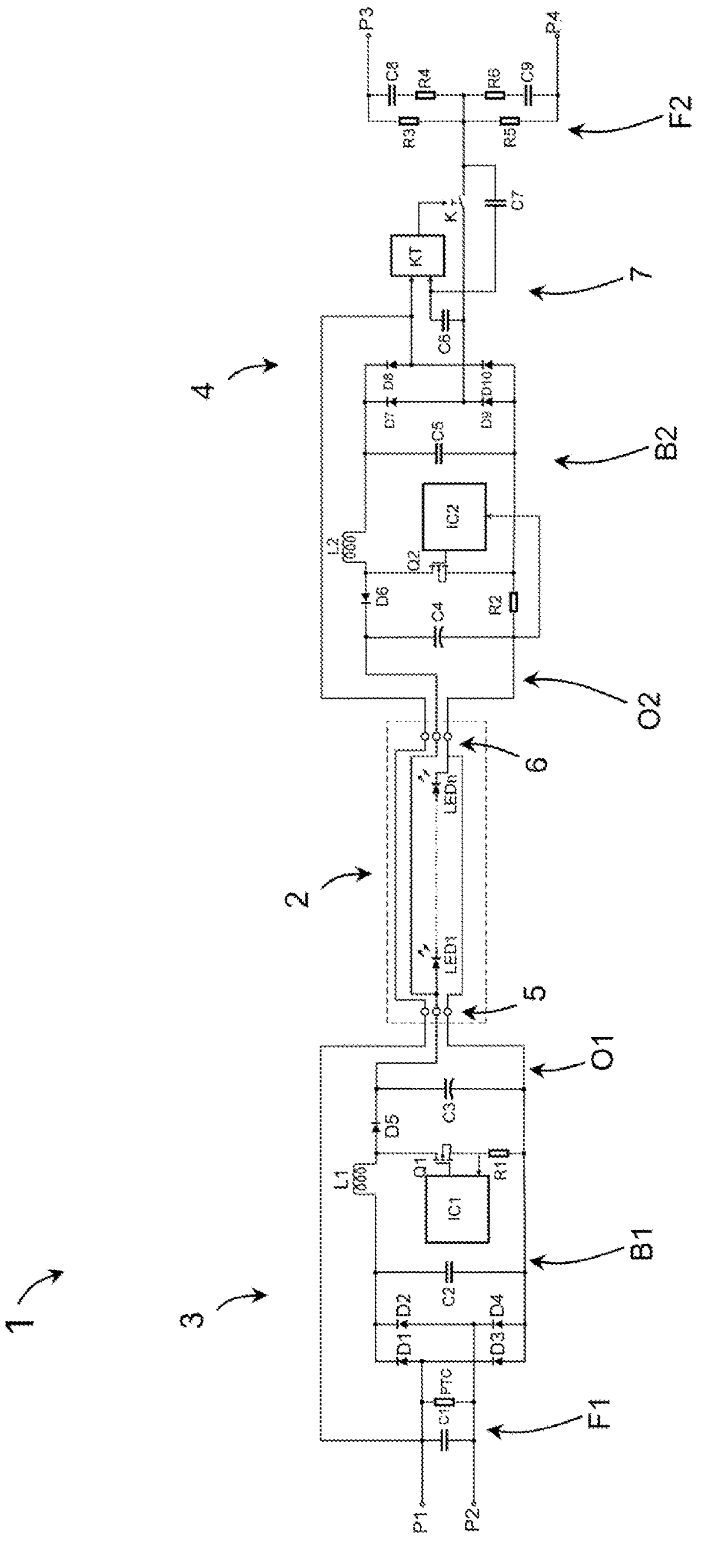
FIG. 1 shows a circuit diagram of an LED tube according to an embodiment.

FIG. 1 shows a circuit diagram of an LED tube according to an embodiment. LED tube 1 comprises an LED light engine 2 with a number of LEDs LED1 to LEDn, a first driver unit 3, and a second driver unit 4 electrically connected to the LED light engine 2. LED tube 1 further comprises a first pair of contact pins P1 and P2 arranged at a first end (left in FIG. 1) of the LED tube 1 and a second pair of pins P3 and P4 arranged at a second end (right in FIG. 1) of the LED tube 1.

The first driver unit 3 comprises an input stage F1 for connecting the first driver unit 3 to a power supply, an output stage O1 for connecting the first driver unit 3 to the LED light engine 2, and a power converter stage B1 for converting an input power into an output power for driving the LED light engine 2.

The second driver unit 4 comprises an input stage F2 for connecting the first driver unit 4 to a power supply, an output stage O2 for connecting the first driver unit 4 to the LED light engine 2, and a power converter stage B2 for converting an input power into an output power for driving the LED light engine 2.

The input stage F1 of the first driver unit 3 comprises a first filament network with an input capacitor C1 and a positive temperature coefficient (PTC) resistor connected in parallel with the input capacitor C1. The output stage O1 of the first driver unit 3 comprises three terminals connected with a first set of contacts 5 of the LED light engine 2.

The power converter stage B1 of the first driver unit 3 comprises a diode bridge rectifier with diodes D1, D2, D3, and D4, an inductance L1, a diode D5, a power switch Q1, a boost controller IC1 for controlling the power switch Q1, an output capacitor C3, and a sense resistor R1. The power converter stage B1 of the first driver unit 3 is configured in a power factor corrected boost converter topology with constant current regulation and a negative feedback logic, based on the boost controller IC1. The boost converter of the first power converter stage B1 is adapted to mains and CCG operation to achieve a high current output resulting in shorter Ton regulation.

The input stage F2 of the second driver unit 4 comprises a second filament network with resistors R3, R4, R5, and R6 and capacitors C8 and C9. The second driver unit 4 further comprises a relay circuit 7 between the input stage F2 and the power converter stage B2. The relay circuit 7 comprises a relay trigger circuit KT, a relay K with a relay capacitor C7 for electrically connecting the input stage F2 and the power converter stage B2 of the second driver unit 4.

In mains or CCG operation, the second filament network of the input stage F2 of the second driver unit 4 has a low impedance and acts as a shorter for the frequencies in the range of about 50 to 60 Hz. T shorter. In ECG operation, it acts as high-frequency short and filament current limiter to ensure good ECG compatibility.

The power converter stage B2 of the second driver unit 4 comprises a high-frequency (HF) bridge rectifier with diodes D7, D8, D9, and D10, an inductance L2, a diode D6, a power switch Q2, a boost controller IC2 for controlling the power switch Q2, an output capacitor C3, and a sense resistor R2. The power converter stage B2 of the second driver unit 4 is configured in a boost converter topology with constant current regulation and positive feedback logic, based on the boost controller IC2. The boost converter of the second power converter stage B2 is adapted to ECG operation to achieve a high output current with a longer Ton regulation. The output stage O2 of the second driver unit 3 comprises three terminals connected with second set of contacts 6 of the LED light engine 2. Thus, first driver unit 3 and second driver unit 4 share the same load, namely the LED light engine 2. In some embodiments, the LED light engine 2 comprises an elongated substrate extending between the first end of the LED tube 1 and the second end of the LED tube 1, the first set of contacts 5 being arranged at the first end of the substrate and the second set 6 of contacts being arranged at the second end of the substrate.

In the embodiment of FIG. 1, the first set 5 of contacts and the second set 6 of contacts each comprise three contacts. The contacts of the first set 5 of contacts on the left side are connected with corresponding contacts of the second set 6 of contacts on the right side by means of electric lines of the LED light engine 2. The LED light engine 2 is connected to the first driver unit 3 and the second driver unit 4 in such a way that the first driver unit 3 and the second driver unit 4 are electrically connected to each other via the electrical lines of the LED light engine 2. In the shown embodiment, the LED chain with the LEDs LED1 to LEDn is connected between the lower line and the middle line, while the upper line serves as a through-contact for connecting the first driver unit 3 with the second driver unit 4. In some embodiments, at least one contact of the first set of contacts connected with a corresponding contact of the second set of contacts establishes an electrical connection between the first driver unit and the second driver unit.

Figure 2:
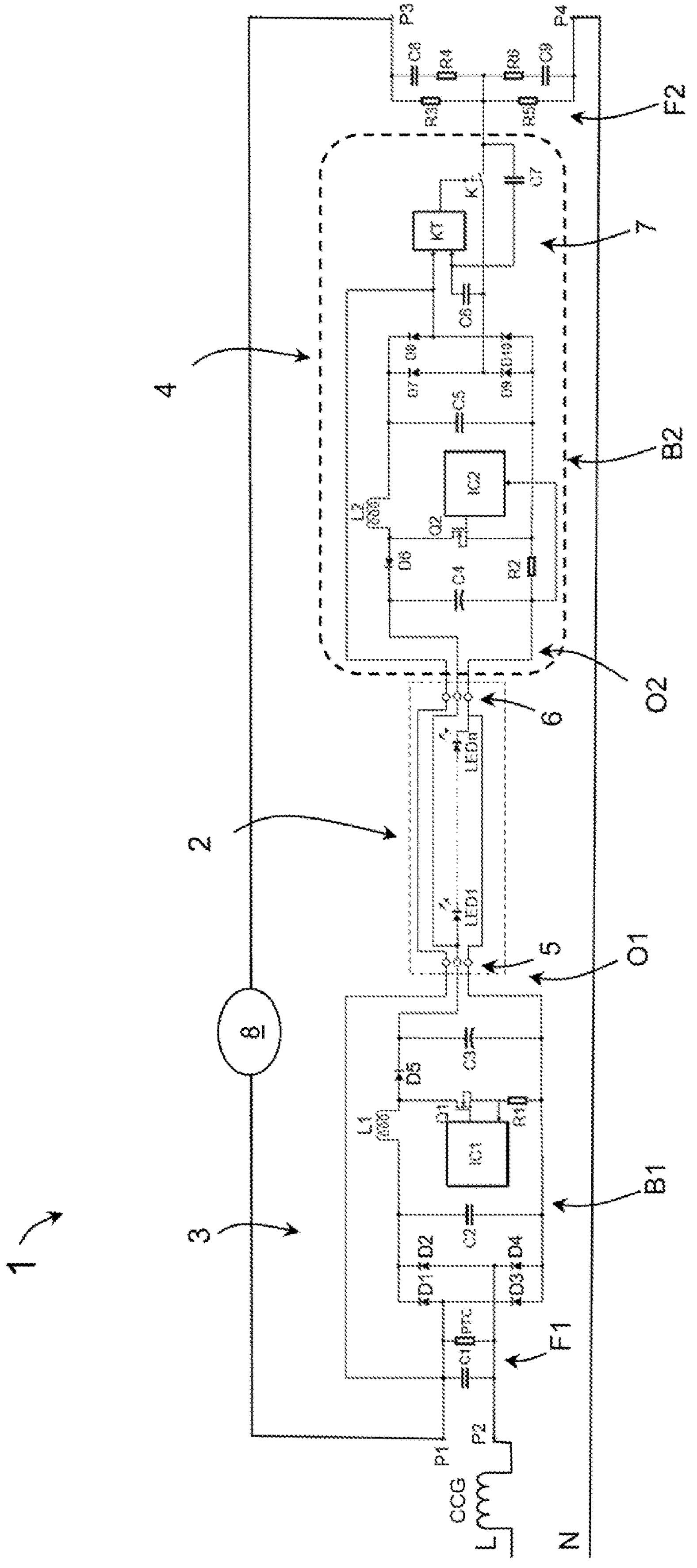
FIG. 2 shows schematically the LED tube of FIG. 1 connected to an electromagnetic control gear (CCG)

FIG. 2 shows schematically the LED tube of FIG. 1 connected to an electromagnetic control gear (CCG). In particular, FIG. 2 illustrates the operation of the LED tube in the CCG mode, when the LED tube is mounted in a luminaire with a conventional ballast CCG and a starter 8. In this case, the LED light engine 2 is driven by the first driver unit with the boost converter in negative feedback logic. The first filament network F1 acts as an electromagnetic interference (EMI) filter, and the PTC resistor acts as self-heating passive component and reaches its Curie temperature, powered by mains voltage. In contrast to the ECG operation mode, the relay K and the capacitor C7 of the relay circuit 7 are not engaged in the case of mains or CCG operation.

Figure 3:
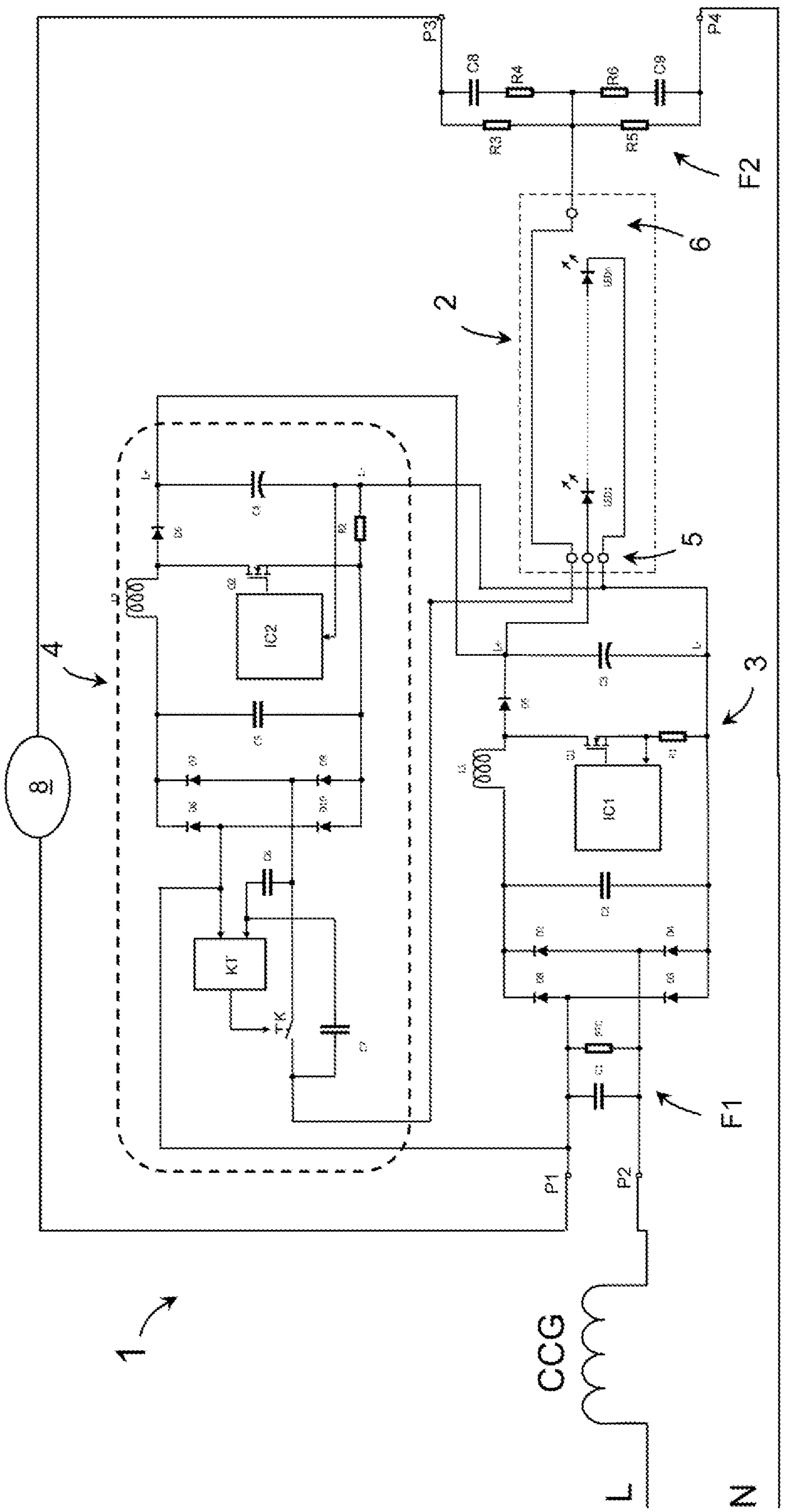
FIG. 3 shows schematically the LED tube of FIG. 1 connected to an electromagnetic control gear (CCG) in another circuit arrangement.

FIG. 3 shows schematically the LED tube of FIG. 1 connected to an electromagnetic control gear (CCG) in another circuit arrangement. In the arrangement of FIG. 3, power converter stage B1 of the first driver unit 3 and the power converter stage B2 of the second driver unit 4 both are connected to the first set 5 of contacts of the LED light engine 2. The second filament circuit of the power input stage F2 of the second driver unit 4 is connected to the second set 6 of contacts of the LED light engine 2. The second filament network of the input stage F2 of the second driver unit 4 is connected via an electrical line (upper line in FIG. 3) of the LED light engine to the relay circuit 7 of the second driver unit 4. Similar to the circuit arrangement of FIG. 2, in the case of CCG operation, the LED light engine 2 is driven by the first driver unit 3, and the power converter stage B2 of the second driver unit 4 (encircled by a dashed line) remains inactive.

Figure 4:
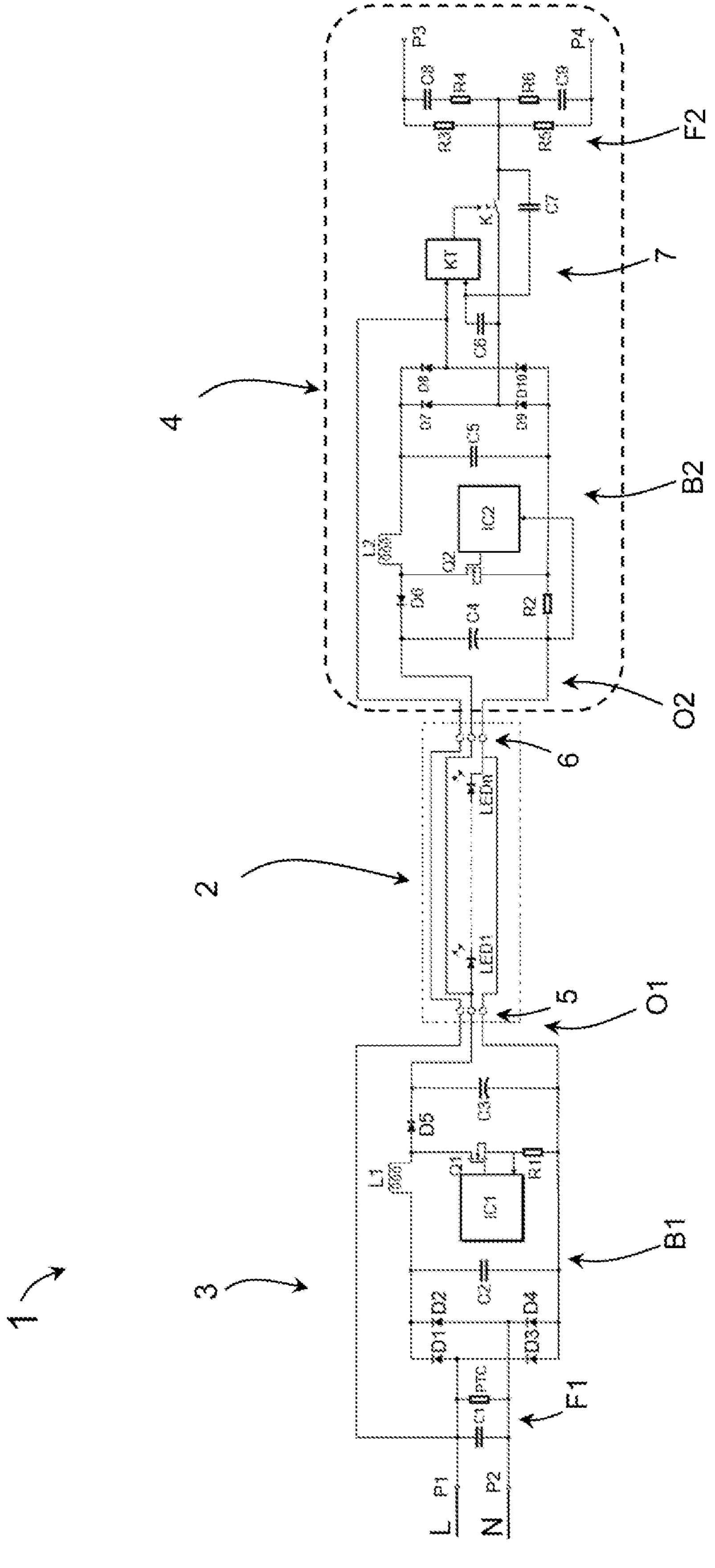
FIG. 4 shows schematically the LED tube of FIG. 1 connected to a mains.

FIG. 4 shows schematically the LED tube of FIG. 1 connected to a mains. The contact pins P1 and P2 of the LED tube 2 are connected to the mains lines L and N. Similar to the CCG operation mode, the capacitor acts as an EMI filter, and the PTC resistor acts as self-heating passive component which reaches its Curie temperature while being powered by mains voltage. Similar to the CCG operation, in the case of the mains operation of the LED tube 1, the LED light engine 2 is driven by the first driver unit 3, while the second driver unit 4 (encircled by a dashed line) remains inactive.

Figure 5:
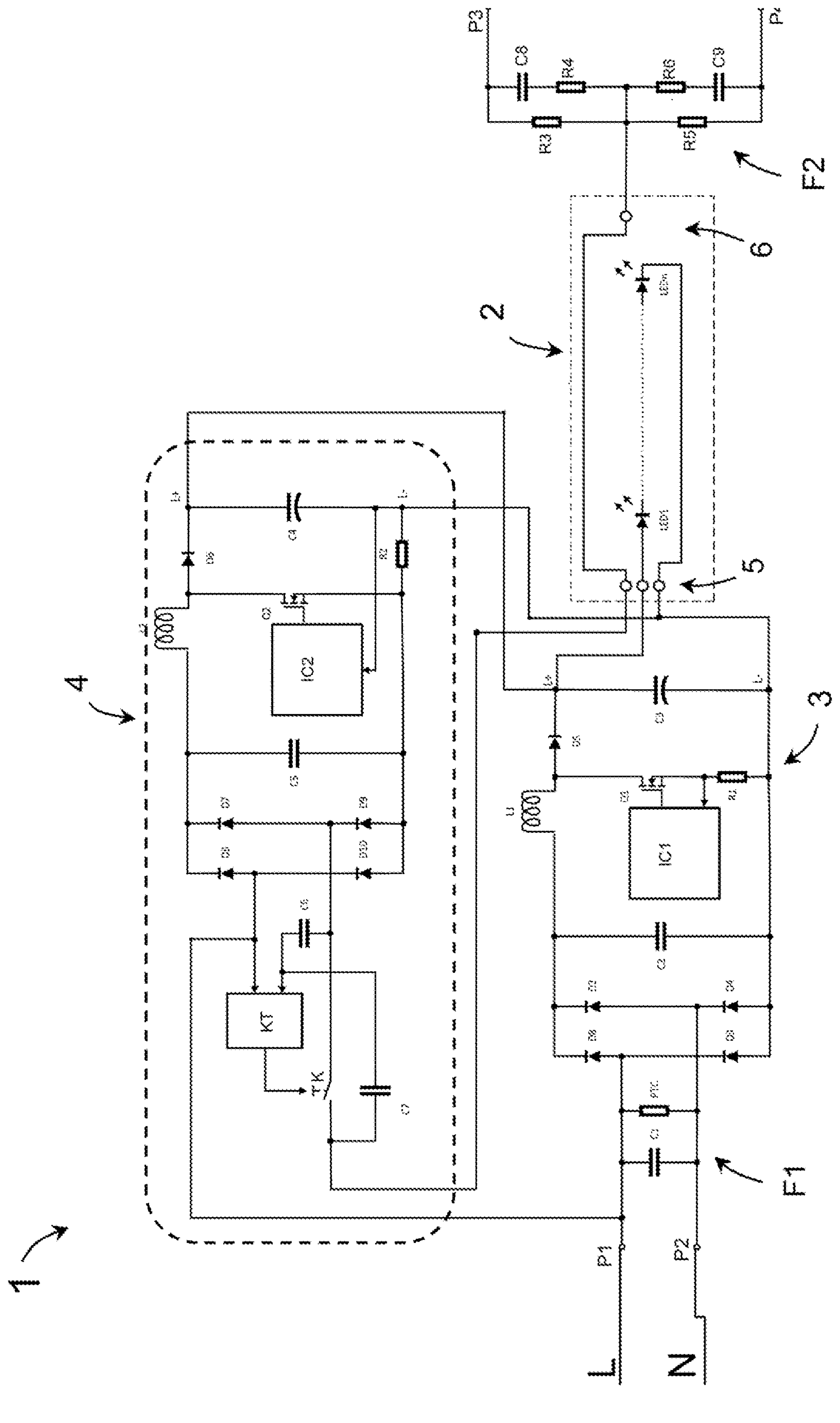
FIG. 5 shows schematically the LED tube of FIG. 1 connected to a mains in another circuit arrangement.

FIG. 5 shows schematically the LED tube of FIG. 1 connected to a mains in another circuit arrangement. In contrast to the circuit arrangement of FIG. 4, in the circuit arrangement of FIG. 5, the second filament network of the input stage F2 of the second driver unit 4 is connected via an electrical line (upper line in FIG. 5) of the LED light engine to the relay circuit 7 of the second driver unit 4.

Figure 6:
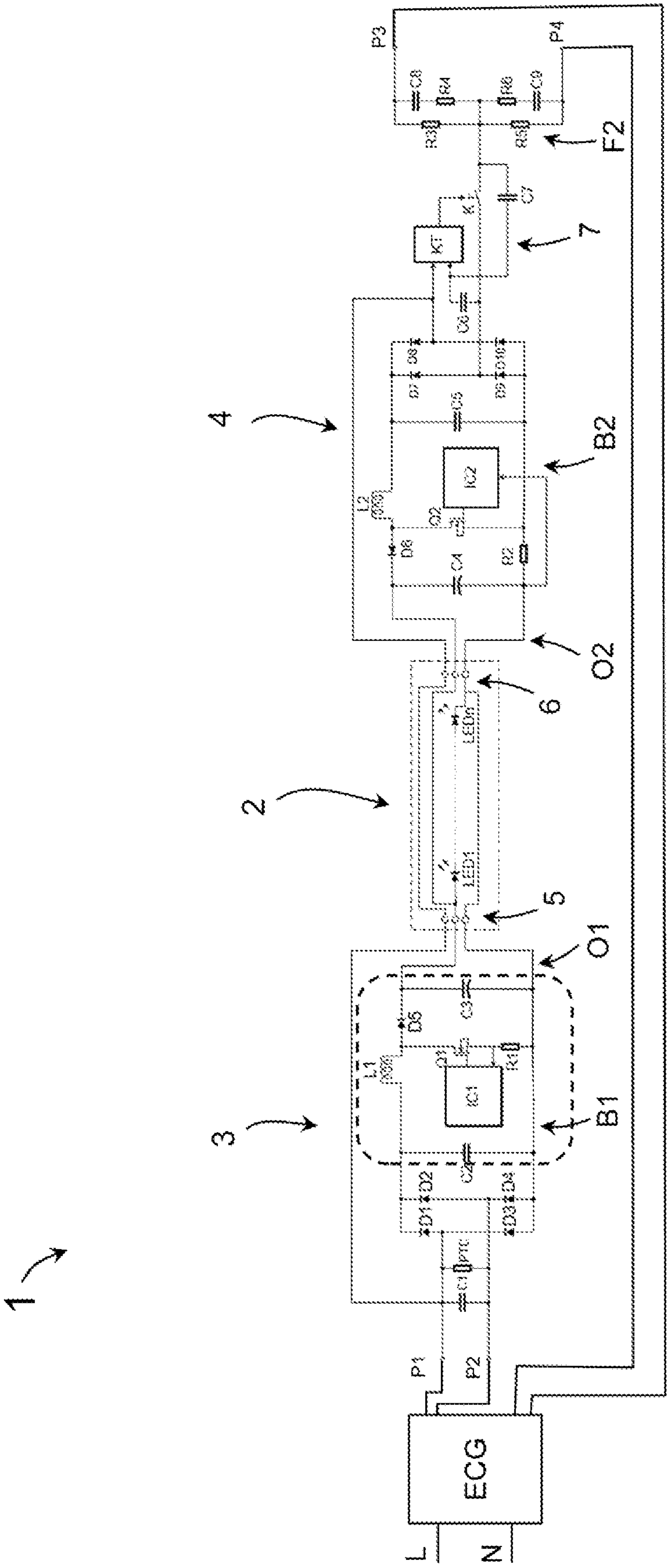
FIG. 6 shows schematically the LED tube of FIG. 1 connected to an electronic control gear (ECG)

FIG. 6 shows schematically the LED tube of FIG. 1 connected to an electronic control gear (ECG). In ECG operation mode, the first filament circuit F1 acts as a high-frequency shorter, and the PTC resistor acts as a filament DC impedance network for the ECG filament detection section, ensuring the ECG compatibility of the LED tube 1. The second filament network acts as a high-frequency short and a filament current limiter to ensure ECG compatibility. The power converter stage B1 of the first driver unit 3 (encircled by a dashed line) remains inactive. In the case of ECG operation, the LED light engine 2 is driven by the second driver unit 4, and the power converter stage B1 of the first driver unit 3 (encircled by a dashed line) remains inactive.

Figure 7:
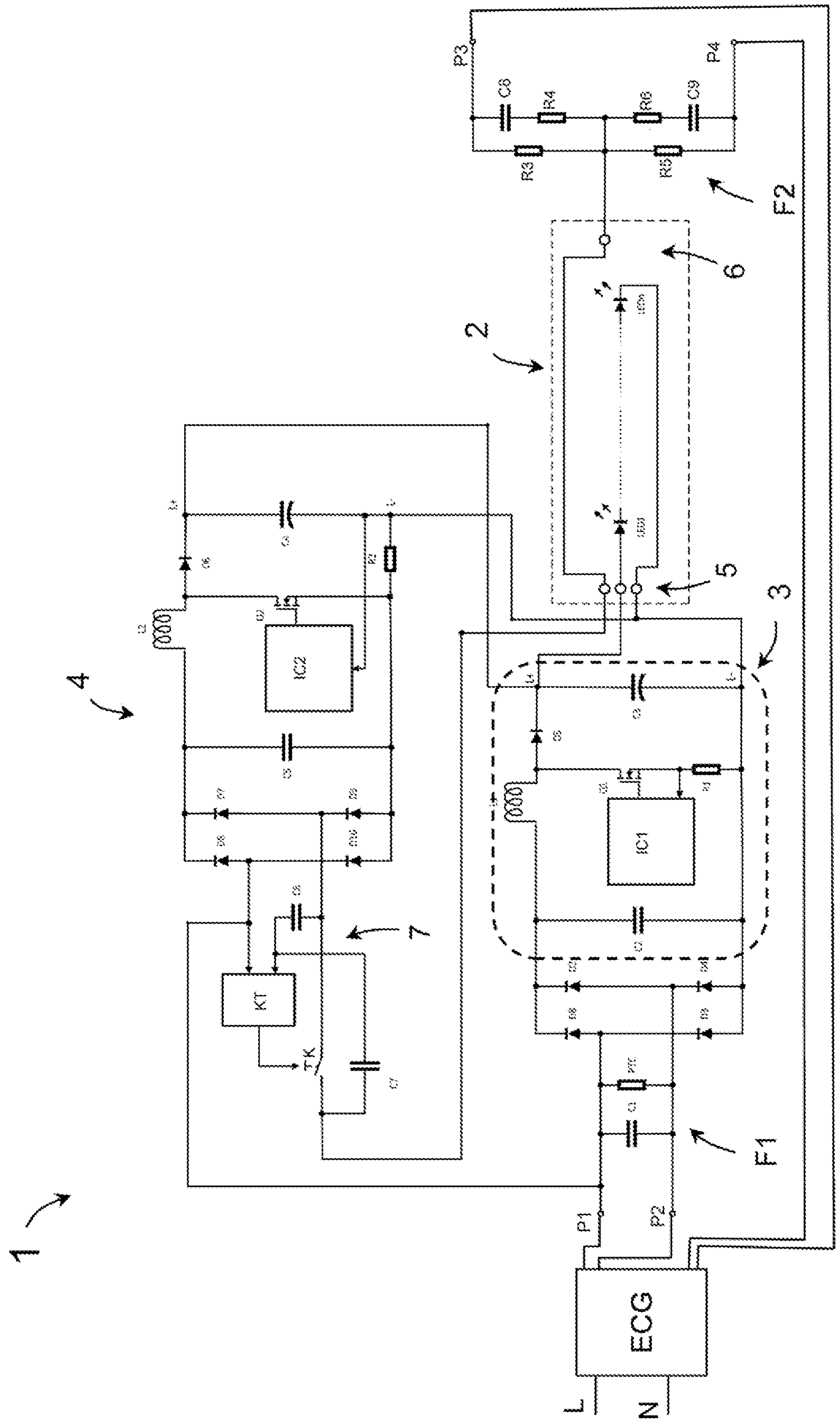
FIG. 7 shows schematically the LED tube of FIG. 1 connected to an electronic control gear (ECG) in another circuit arrangement.

FIG. 7 shows schematically the LED tube of FIG. 1 connected to an electronic control gear (ECG) in another circuit arrangement. In the arrangement of FIG. 7, the power converter stage B1 of the first driver unit 3 and the power converter stage B2 of the second driver unit 4 both are connected to the first set 5 of contacts of the LED light engine 2. Similar to the circuit arrangement of FIG. 6, the LED light engine 2 is driven by the second driver unit 4, and the power converter stage B1 of the first driver unit 3 (encircled by a dashed line) remains inactive.

Figure 8:
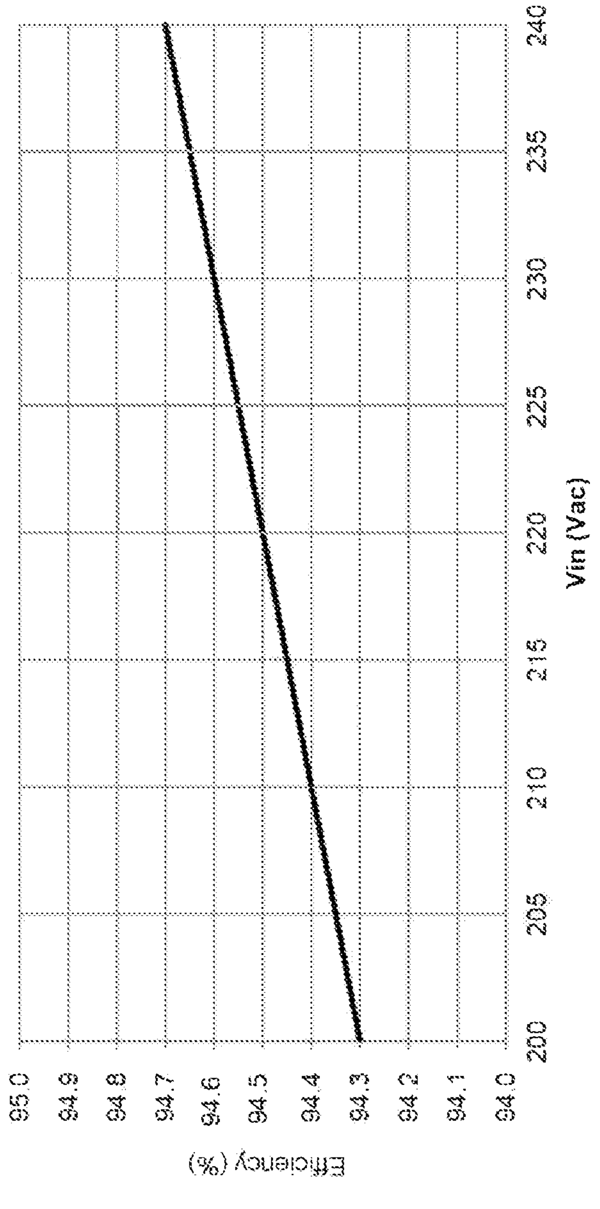
FIG. 8 shows the dependance of the mains operation efficiency of the LED tube on the input voltage, according to one embodiment.

FIG. 8 shows the dependance of the mains operation efficiency of the LED tube on the input voltage, according to one embodiment. In particular, the efficiency of the LED tube has been measured in the mains operation mode corresponding to the circuit arrangement as shown in FIG. 6 or 7. The input voltage has been varied in the range from 200 V to 240 V. As it can be seen from FIG. 8, the efficiency of the LED tube in this range of the input voltage lies above 94%, showing a steady growth from 94.3% (at 200 V) to 94.7% (at 240 V).

The boost convertor architecture of the universal driver described above enables a highly efficient operation of the LED tube in all operation modes of the LED tube. Moreover, due to its simple interface with three or fewer connections at each side of the LED light engine, the driver easily can be connected to the LED light engine.

While at least one exemplary embodiment has been presented in the foregoing detailed description, it should be appreciated that a vast number of variations exists. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments.

REFERENCE SYMBOLS AND NUMERALS

1 LED tube
2 LED light engine
3 first driver unit
4 second driver unit
5 first set of contact
6 second set of contact
7 relay circuit
8 starter
B1 power converter stage of the first driver unit
B2 power converter stage of the second driver unit
C1-C9 capacitor
CCG CCG inductor
D1-D10 diode
F1 input stage with a first filament network
F2 input stage with a second filament network
IC1 booster controller of the first driver unit
IC2 booster controller of the second driver unit
K relay
KT relay trigger circuit
L1, L2 inductor
PTC PTC (positive temperature coefficient) resistor
O1 output stage of the first driver unit
O2 output stage of the second driver unit
P1-P4 contact pin
R1-R6 resistor
L first AC mains terminal
N second AC mains terminal

What is claimed is:

1. A driver for driving a light-emitting diode (LED) light engine of an LED tube, the driver comprising:

a first driver unit comprising a first input stage for connecting the first driver unit to a power supply, a first output stage for connecting the first driver unit to the LED light engine, and a first power converter stage for converting a first input power from an alternating current (AC) mains or an electromagnetic control gear (CCG) into a first output power for driving the LED light engine; and a second driver unit comprising a second input stage for connecting the second driver unit with the power supply, a second output stage for connecting the second driver unit to the LED light engine, a second power converter stage for converting a second input power from an electronic control gear (ECG) into a second output power for driving the LED light engine, and a relay and a relay trigger circuit for electrically connecting the second input stage and the second power converter stage such that the second input stage is galvanically isolated from the second power converter stage;

wherein the first driver unit and the second driver unit are electrically connectable to the LED light engine in such a way that:

when the LED tube is connected to the AC mains or CCG, the first driver unit is active for driving the LED light engine, and the second driver unit remains inactive; and when the LED tube is connected to the ECG, the second driver unit is active for driving the LED light engine, and the first driver unit remains inactive.

2. The driver of claim 1, wherein at least one of:

the power converter stage of the first driver unit comprises a power factor corrected boost converter with a negative feedback logic for AC mains and CCG operation; and the power converter stage of the second driver unit comprises a high-frequency bridge rectifier and a boost converter with positive feedback logic for ECG operation only.

3. The driver of claim 1, wherein the first input stage of the first driver unit comprises a filament network configured to act as:

an electromagnetic interference filter for AC mains and CCG operation; and a filament for ECG operation.

4. The driver of claim 3, wherein the first filament network comprises an input capacitor and a positive temperature coefficient (PTC) resistor connected in parallel with the input capacitor.

5. The driver of claim 1, wherein the second input stage of the second driver unit comprises a filament network configured to act as:

a low-impedance pass filter for the AC mains and CCG operation; and a high-frequency shorter as well as a filament current limiter for ECG operation.

6. The light-emitting diode (LED) tube comprising:

a first pair of contact pins arranged at a first end of the LED tube;

a second pair of contact pins arranged at a second end of the LED tube;

the LED light engine; and the driver of claim 1 for driving the LED light engine;

wherein the first pair of contact pins is electrically connected to the first input stage of the first driver unit;

wherein the second pair of contact pins is electrically connected to the second input stage of the second driver unit; and wherein the first driver unit and the second driver unit are electrically connected to the LED light engine.

7. The LED tube of claim 6, wherein the LED light engine comprises an LED circuit with:

a first set of contacts at the first end of the LED tube;

a second set of contacts at the second end of the LED tube; and electrical lines electrically connecting at least one contact of the first set of contacts with at least one contact of the second set of contacts.

8. The LED tube of claim 6, wherein the LED light engine is connected to the first driver unit and the second driver unit in such a way that at least one electrical line electrically connecting at least one contact of the first set of contacts with a corresponding contact of the second set of contacts establishes an electrical connection between the first driver unit and the second driver unit.

9. The driver of claim 1, wherein said galvanic isolation ensures electrical pin-safety for a user of the LED tube when being mounted into a luminaire.

10. A driver configured for driving a light-emitting diode (LED) light engine, the driver comprising:

a first driver unit configured for at least one of alternating current (AC) mains operation and conventional control gear (CCG) operation of the LED light engine; and a second driver unit configured for electronic control gear (ECG) operation of the LED light engine;

wherein:

in AC mains operation or CCG operation of the LED light engine, the first driver unit is active and drives the LED light engine, and the second driver unit remains inactive;

in ECG operation of the LED light engine the second driver unit is active and drives the LED light engine, and the first driver unit remains inactive; and the second driver unit comprises a relay and a relay trigger circuit for electrically connecting an input stage of the second driver unit and a power converter stage of the second driver unit such that the input stage of the second driver unit is galvanically isolated from the power converter stage of the second driver unit.

11. The driver of claim 10, wherein the first driver unit comprises a power converter stage configured in a power factor corrected boost converter topology.

12. The driver of claim 11, wherein at least one of:

the power converter stage further includes at least one of constant current regulation and negative feedback logic; and the power converter stage comprises at least one of: a diode bridge rectifier; an inductance;

a diode; a power switch; a boost controller; an output capacitor; and a sense resistor.

13. The driver of claim 10, wherein the second driver unit comprises a power converter stage configured in a boost converter topology.

14. The driver of claim 13, wherein at least one of:

the power converter stage further includes at least one of constant current regulation and positive feedback logic; and the power converter stage comprises at least one of: a high-frequency (HF) bridge rectifier; an inductance; a diode; a power switch; a boost controller; an output capacitor; and a sense resistor.

15. The driver of claim 10, wherein the first driver unit is adapted to both AC mains operation and CCG operation of the LED light engine.

16. The driver of claim 10, wherein the first driver unit and the second driver unit are configured to be electrically connected to each other via one or more electrical lines of the LED light engine.

17. A system comprising:

a tube lamp comprising the LED light engine; and the driver of claim 10 configured to be operatively coupled with the light engine.

18. An LED tube lamp comprising the driver of claim 10 operatively coupled with the LED light engine.

19. A luminaire configured for at least one of AC mains operation, CCG operation, and ECG operation of a tube lamp comprising the LED light engine, the luminaire comprising the driver of claim 10.

20. The luminaire of claim 19, wherein the luminaire is configured for CCG operation and comprises a starter configured to be operatively coupled with the tube lamp.

* * * * *